(12) United States Patent
Gabbin et al.

(10) Patent No.: US 10,030,673 B2
(45) Date of Patent: Jul. 24, 2018

(54) AXIAL FAN FOR A COOLING FAN MODULE

(71) Applicant: JOHNSON ELECTRIC S.A., Murten (CH)

(72) Inventors: Giuliano Gabbin, Asti (IT); Ermanno Procopio, Asti (IT); Vincenzo Lamattina, Asti (IT)

(73) Assignee: Johnson Electric S.A., Murten (CH)

( * ) Notice: Subject to any disclaimer, the term of this patent is extended or adjusted under 35 U.S.C. 154(b) by 284 days.

(21) Appl. No.: 14/694,668

(22) Filed: Apr. 23, 2015

(65) Prior Publication Data

US 2015/0308457 A1  Oct. 29, 2015

(30) Foreign Application Priority Data

Apr. 23, 2014  (IT) .............. TO2014A0340

(51) Int. Cl.
| | |
|---|---|
| *F04D 29/66* | (2006.01) |
| *F04D 19/00* | (2006.01) |
| *F04D 25/06* | (2006.01) |
| *F04D 25/08* | (2006.01) |
| *F04D 29/32* | (2006.01) |
| *F04D 29/64* | (2006.01) |
| *B60K 11/00* | (2006.01) |

(52) U.S. Cl.
CPC .......... *F04D 29/663* (2013.01); *B60K 11/00* (2013.01); *F04D 19/002* (2013.01); *F04D 25/06* (2013.01); *F04D 25/0606* (2013.01); *F04D 25/08* (2013.01); *F04D 29/329* (2013.01); *F04D 29/646* (2013.01); *F04D 29/668* (2013.01)

(58) Field of Classification Search
CPC ...... F04D 29/663; F04D 19/002; F04D 25/06; F04D 25/0606; F04D 25/08; F04D 29/329; F04D 29/646; F04D 29/668
USPC ......................................... 416/181
See application file for complete search history.

(56) References Cited

U.S. PATENT DOCUMENTS

| | | | | |
|---|---|---|---|---|
| 2,154,385 | A | * 4/1939 | Riesing ............ | F16D 3/70 290/1 C |
| 2,488,945 | A | 11/1949 | Troller et al. | |
| 3,449,605 | A | * 6/1969 | Wilson ............ | B01D 46/0021 310/58 |
| 5,829,956 | A | * 11/1998 | Chen ............ | B63H 1/14 416/175 |

(Continued)

FOREIGN PATENT DOCUMENTS

DE  4118998 A1  12/1992

*Primary Examiner* — Aaron R Eastman
(74) *Attorney, Agent, or Firm* — Muncy, Geissler, Olds & Lowe, P.C.

(57) ABSTRACT

An axial fan for a cooling fan module has a cup-shaped central hub with a front wall intended to be connected to the rotor of an electric motor at connection points and with a side wall from which a plurality of outer blades extend. At least one transverse opening is provided in the front wall of the hub, between each of the connection points and the side wall, the opening extending in the circumferential direction, relative to the axis of the hub, beyond the associated connection point in both directions, so that the vibrations transmitted during operation from the motor to the front wall of the hub are propagated towards the side wall of the hub following a path which is longer than a radial path.

8 Claims, 3 Drawing Sheets

(56) References Cited

U.S. PATENT DOCUMENTS

| | | | |
|---|---|---|---|
| 8,123,467 B2* | 2/2012 | Lin | F04D 25/0613 415/119 |
| 8,536,747 B1* | 9/2013 | Baggett | H02K 21/24 310/114 |
| 2004/0013526 A1* | 1/2004 | Nilson | F04D 29/329 416/189 |
| 2004/0047734 A1* | 3/2004 | Nilson | F04D 29/384 416/189 |
| 2006/0202578 A1* | 9/2006 | Pricope | F04D 29/329 310/91 |
| 2006/0251509 A1* | 11/2006 | Spaggiari | F04D 25/082 415/121.2 |
| 2007/0210675 A1* | 9/2007 | Bender | H02K 1/2793 310/268 |
| 2008/0286093 A1* | 11/2008 | Bauer, Jr. | F04D 29/263 415/146 |
| 2010/0008762 A1* | 1/2010 | Wada | A47L 5/14 415/119 |

* cited by examiner

AXIAL FAN FOR A COOLING FAN MODULE

CROSS REFERENCE TO RELATED APPLICATIONS

This non-provisional patent application claims priority under 35 U.S.C. § 119(a) from Patent Application No. TO2014A000340, filed in Italy on Apr. 23, 2014, the entire contents of which are hereby incorporated by reference.

FIELD OF THE INVENTION

The present invention relates to an electric fan for a cooling fan module, in particular for a heat exchanger (such as a radiator) of a motor vehicle.

BACKGROUND OF THE INVENTION

More specifically, the present invention relates to an axial fan for use in such a module, comprising an essentially cup-shaped central hub with a front wall intended to be connected to the rotor of an electric motor at/in a plurality of connection points or areas, and a side wall from which a plurality of outer blades extend.

These fans are generally fixed to the rotor of the drive motor by means of screws or bolts.

During operation the motor generates considerable vibrations which are transmitted to the fan and cause the generation of an acoustic noise which is somewhat bothersome for the human ear, in particular at the low and middle range speeds.

SUMMARY OF THE INVENTION

Hence there is a desire for a fan of this type designed so as to overcome the abovementioned drawback of fans according to the prior art.

Accordingly, in one aspect thereof, the present invention provides an axial fan for a cooling fan module, comprising an essentially cup-shaped central hub with a front wall configured to be connected to the rotor of an electric motor at a plurality of connection points and with a side wall from which a plurality of outer blades extend, the fan having an axis about which the fan rotates in use; wherein at least one essentially transverse opening is provided in the front wall of the hub, between each of the connection points and the side wall, the opening extending in the circumferential direction, relative to the axis of the hub, beyond the associated connection point in both directions, so that vibrations transmitted during operation from the motor to the front wall of the hub are propagated towards the side wall of the hub following a path which is longer than a radial path.

Preferably, the transverse opening in the front wall of the hub, associated with each connection point, is in the form of an arc, i.e. a part of a circumference of a circle.

Preferably, at each connection point the front wall of the hub of the fan has a through-hole for receiving a fixing member for fixing the hub to the rotor of the motor, and wherein the extension in the circumferential direction of the opening is at least equal to three times the diameter of the corresponding through-hole.

Optionally, the extension in the circumferential direction of the opening is about five times the diameter of the corresponding through-hole in each direction.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
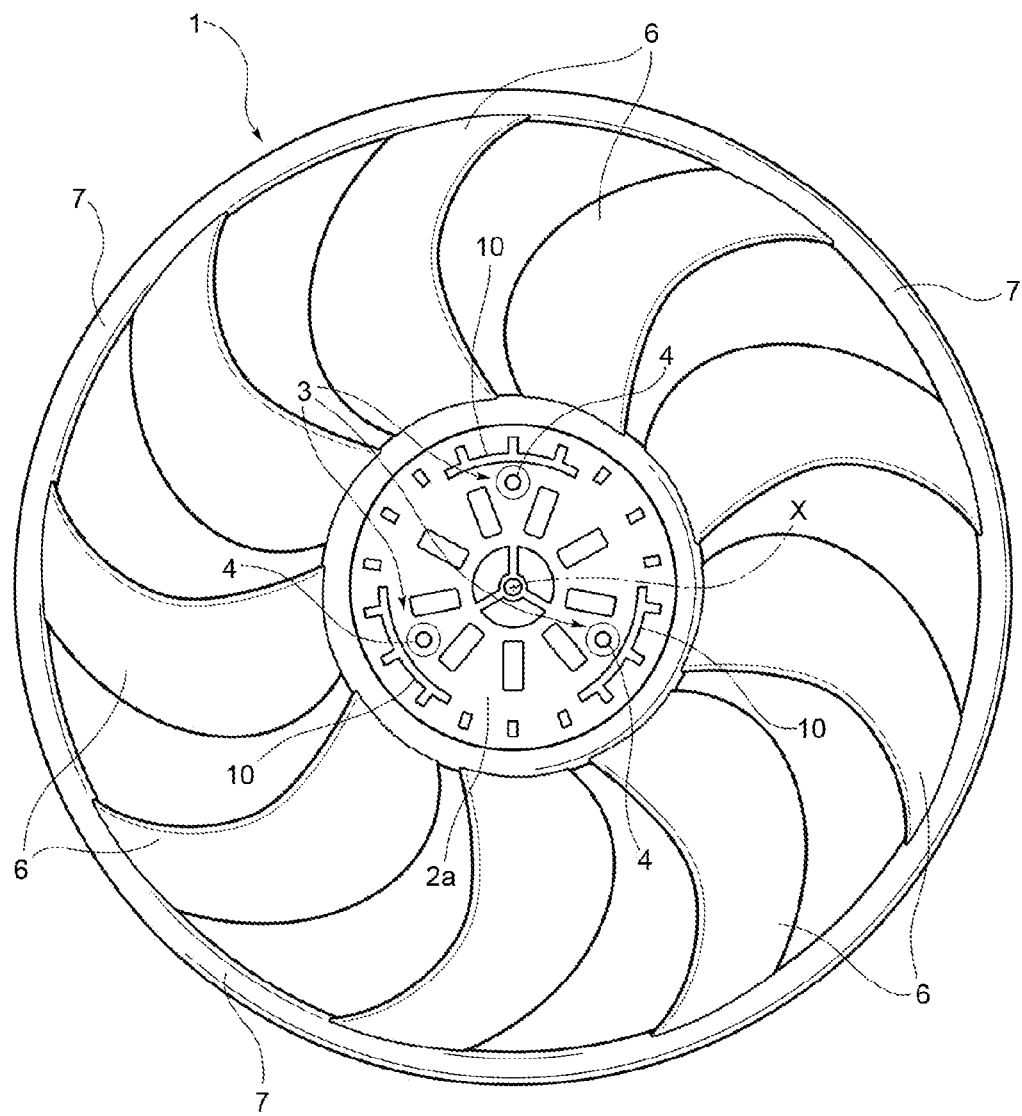
FIG. 1 is a front view of a fan according to the preferred embodiment of the present invention.
Figure 2:
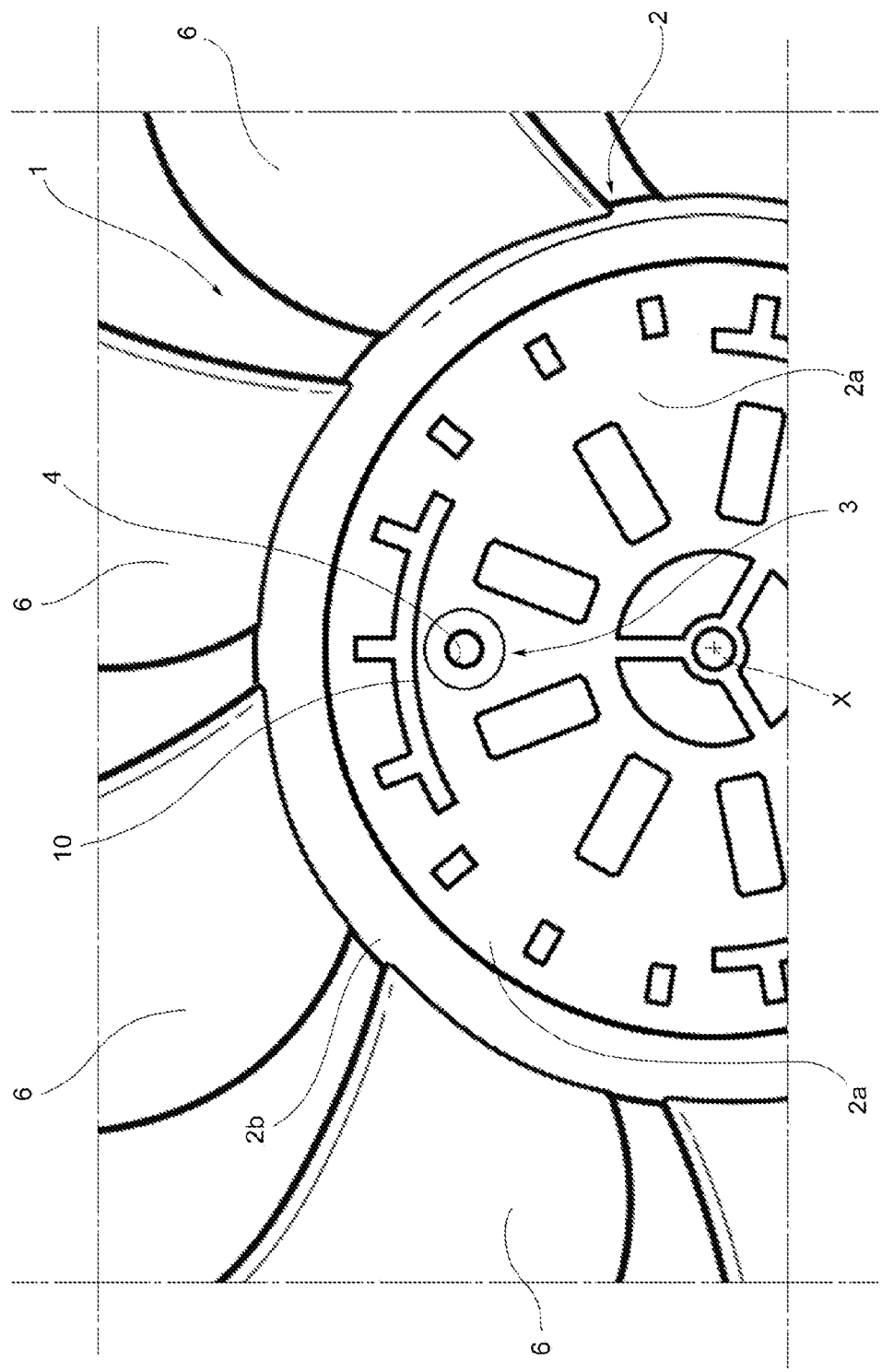
FIG. 2 is a partial view, on a larger scale, showing a detail of FIG. 1.

In the drawings 1 denotes overall an axial fan according to the preferred embodiment of the present invention. In the example embodiment shown the fan 1 comprises an essentially cup-shaped central hub 2. The hub 2 has a front wall 2a intended to be connected to the rotor R of an electric motor M (FIG. 3) at a plurality of connection points 3. It should be realized that the term connection point may not be necessarily a single point and may include a connection area, in accordance with the type of fixing member or fastener used.

Figure 3:
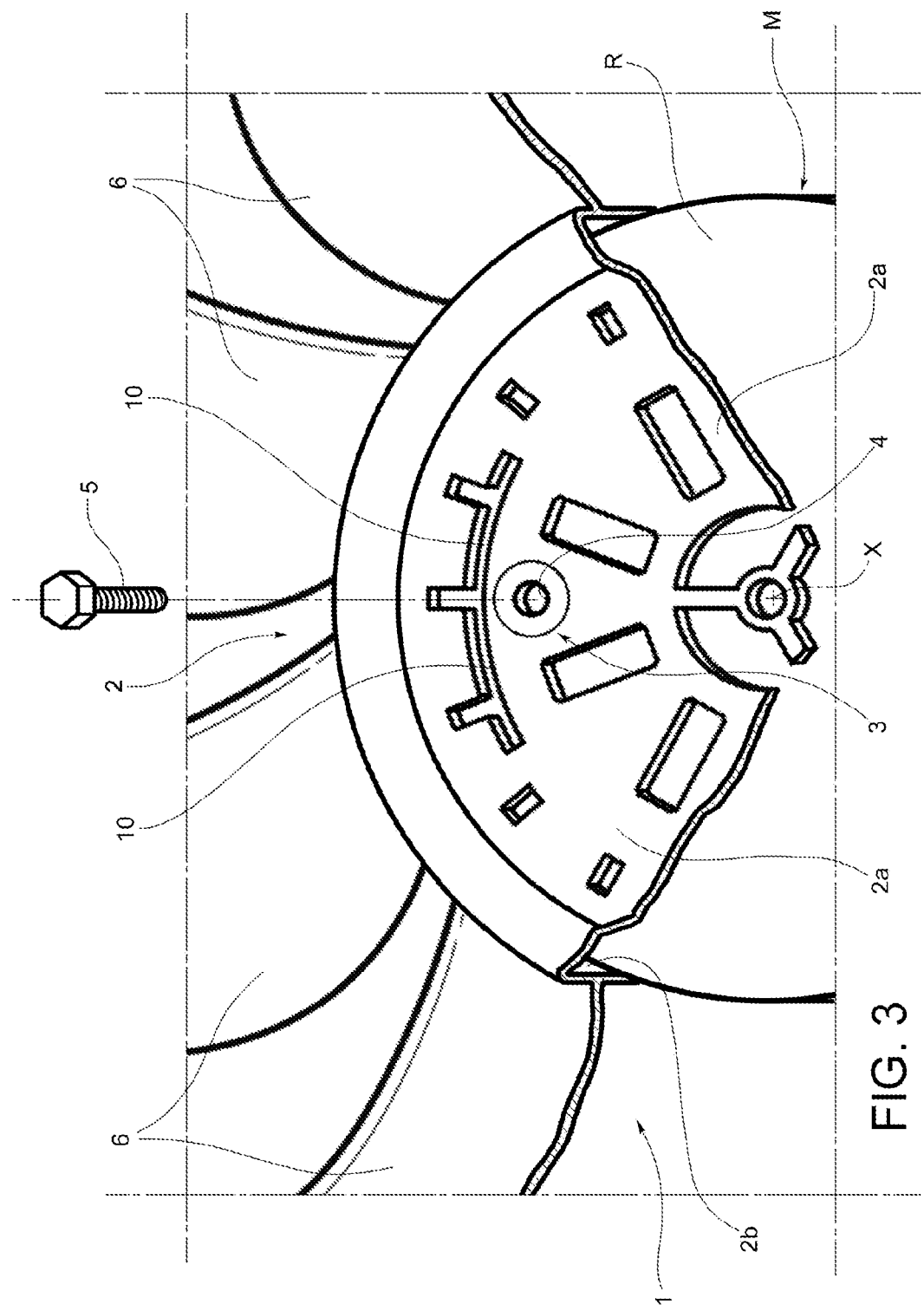
FIG. 3 is a partial perspective view, which shows fixing of a fan to the rotor of an electric motor.

In the embodiment shown each connection point 3 comprises an essentially circular through-hole 4 for receiving a corresponding screw 5 for fixing the hub 2 to the rotor R (see FIG. 3).

As shown in FIG. 1, the front wall 2a of the hub 2 of the fan has three connection points 3 in positions offset with respect to the axis X of the hub 2 and the fan and angularly equidistant.

The hub 2 also has an at least approximately cylindrical side wall 2b from which a plurality of curved outer blades 6 extend.

Preferably, as shown, the outer ends of the blades 6 are connected to a peripheral ring 7 coaxial with the hub 2.

An essentially transverse opening 10 is formed in the front wall 2a of the hub 2, between each connection point 3 and the side wall 2b. This opening extends in the circumferential direction, relative to the axis X of the hub 2, beyond the associated through-hole 4 in both directions.

The arrangement is such that, during operation, the vibrations transmitted from the rotor R of the motor M to the front wall 2a of the hub at the connection points 3 are propagated in the front wall 2a towards the side wall 2b following a path which has to go around the openings 10 and which is therefore considerably longer than an essentially radial path which would instead exist in the absence of these openings 10. As a result, the vibrations are significantly dampened in the front wall 2a of the fan hub, before they reach the side wall 2b of this hub and then the blades 6 and the peripheral ring 7. The acoustic noise level generated during operation of the fan as a result of the vibrations transmitted from the electric motor is thus drastically reduced.

In the embodiment shown the transverse openings 10 associated with each connection point 3 are in the form of arcs or parts of circles.

Conveniently, although not necessarily, the extension, in each circumferential direction, of the openings 10 is at least equal to about 3 times, and preferably about 5 times, the diameter of the corresponding through-holes 4.

The fan 1 may be conveniently made of molded plastic and the openings 10 in the front wall 2a of its hub 2 are conveniently formed during the fan molding operation.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An axial fan for a cooling fan module, comprising a hub with a front wall configured to be connected to a rotor of an electric motor at a plurality of connection points and with a side wall from which a plurality of outer blades extend, the fan having an axis about which the fan rotates in use;

wherein at least one arc shaped main opening is formed in the front wall of the hub, between an associated connection point and the side wall, the at least one arc shaped main opening extending in a circumferential direction, relative to the axis of the fan, beyond the associated connection point, so that vibrations transmitted during operation from the motor to the front wall of the hub are propagated towards the side wall of said hub following a path which is longer than a radial path, and wherein a plurality of secondary openings are formed in the front wall at intervals along the circumferential direction, and a radial inner side of at least one secondary opening is connected with a radial outer side of the at least one arc shaped main opening.

2. The fan of claim 1, wherein the front wall has a plurality of arc shaped main openings, radial outer sides of the arc shaped main openings and radial inner sides of the secondary openings are located on a same circumference centered on the axis of the fan.

3. The fan of claim 2, wherein the front wall further comprises a shaft hole in a center of the front wall, and a plurality of ventilation holes surrounding the shaft hole, at least one ventilation hole extending radially between the shaft hole and the at least one arc shaped main opening.

4. The fan of claim 1, wherein at each connection point the front wall of the hub of the fan has a through-hole for receiving a fixing member for fixing the hub to the rotor of the motor, and wherein an extension in the circumferential direction of the at least one arc shaped main opening is at least equal to three times a diameter of the corresponding through-hole.

5. The fan of claim 4, wherein the extension in the circumferential direction of the at least one arc shaped main opening is five times the diameter of the corresponding through-hole in each direction.

6. The fan of claim 1, wherein at each connection point the front wall of the hub of the fan has a through-hole for receiving a fixing member for fixing the hub to the rotor of the electric motor.

7. The fan of claim 1, wherein the associated connection point corresponds to a center portion of the at least one arc shaped main opening.

8. The fan of claim 1, wherein the front wall comprises three connection points, and three corresponding arc shaped main openings.

* * * * *